(12) United States Patent
Ranganathan et al.

(10) Patent No.: US 11,319,455 B2
(45) Date of Patent: May 3, 2022

(54) CABLES COATED WITH FLUOROCOPOLYMER COATINGS

(71) Applicants: GENERAL CABLE TECHNOLOGIES CORPORATION, Highland Heights, KY (US); ARKEMA INC., King of Prussia, PA (US)

(72) Inventors: Sathish Kumar Ranganathan, Indianapolis, IN (US); Srinivas Siripurapu, Carmel, IN (US); Vijay Mhetar, Carmel, IN (US); Ryan M. Andersen, Williamsport, PA (US); Kurt Arthur Wood, Abington, PA (US)

(73) Assignees: General Cable Technologies Corporation, Highland Heights, KY (US); Arkema Inc., King of Prussia, PA (US)

( * ) Notice: Subject to any disclaimer, the term of this patent is extended or adjusted under 35 U.S.C. 154(b) by 1243 days.

(21) Appl. No.: 15/349,522

(22) Filed: Nov. 11, 2016

(65) Prior Publication Data

US 2017/0137659 A1 May 18, 2017

Related U.S. Application Data

(60) Provisional application No. 62/255,224, filed on Nov. 13, 2015.

(51) Int. Cl.
*C09D 127/16* (2006.01)
*H01B 1/02* (2006.01)
*H01B 3/44* (2006.01)

(52) U.S. Cl.
CPC .......... *C09D 127/16* (2013.01); *H01B 1/023* (2013.01); *H01B 3/445* (2013.01); *H01B 3/447* (2013.01)

(58) Field of Classification Search
CPC ....... C09D 127/16; C08L 27/16; C08L 33/12; C08L 33/06; C08L 33/08; C08L 33/10; H01B 1/023; H01B 3/445; H01B 3/447
See application file for complete search history.

(56) References Cited

U.S. PATENT DOCUMENTS

| | | | |
|---|---|---|---|
| 4,383,133 A | 5/1983 | Lanfranconi |
| 4,513,173 A | 4/1985 | Merry |
| 4,801,501 A | 1/1989 | Harlow |
| 4,988,835 A | 1/1991 | Shah |

(Continued)

FOREIGN PATENT DOCUMENTS

| | | |
|---|---|---|
| CN | 101125979 A | 2/2008 |
| CN | 201408590 Y | 2/2010 |

(Continued)

OTHER PUBLICATIONS

Marsitzky, Dirk; Extended European Search Report, including the supplementary European search report and the European search opinion, issued in European Patent Application No. 16865110.7; dated Oct. 19, 2018; 5 pages.

(Continued)

*Primary Examiner* — Holly Rickman
*Assistant Examiner* — Linda N Chau
(74) *Attorney, Agent, or Firm* — Ulmer & Berne LLP

(57) ABSTRACT

Coating compositions including a binder agent are disclosed. The binder agent is formed of a fluorocopolymer and a non-fluorinated film-forming polymer. Methods of coating cables with the coating compositions are also described herein.

27 Claims, 2 Drawing Sheets

(56) References Cited

U.S. PATENT DOCUMENTS

| | | |
|---|---|---|
| 5,217,391 A | 6/1993 | Fisher, Jr. |
| 5,269,701 A | 12/1993 | Leibfried |
| 5,518,420 A | 5/1996 | Pitschi |
| 5,725,953 A | 3/1998 | Onishi et al. |
| 6,018,000 A | 1/2000 | Keeny et al. |
| 6,027,373 A | 2/2000 | Gray et al. |
| 6,159,046 A | 12/2000 | Wong |
| 6,369,328 B1 | 4/2002 | Munakata |
| 7,015,395 B2 | 3/2006 | Goldsworthy et al. |
| 7,381,089 B2 | 6/2008 | Hosler, Sr. |
| 7,384,307 B1 | 6/2008 | Wang |
| 7,438,971 B2 | 10/2008 | Bryant et al. |
| 7,488,209 B2 | 2/2009 | Vaccaro |
| 7,527,512 B2 | 5/2009 | Montena |
| 7,637,774 B1 | 12/2009 | Vaccaro |
| 7,683,262 B2 | 3/2010 | Guery et al. |
| 7,752,754 B2 | 7/2010 | Goldsworthy et al. |
| 7,934,954 B1 | 5/2011 | Chawgo et al. |
| 7,935,890 B2 | 5/2011 | Holzmueller et al. |
| 7,939,764 B2 | 5/2011 | Gottfried et al. |
| 8,165,439 B2 | 4/2012 | Overton |
| 8,211,220 B2 | 7/2012 | Kim |
| 8,371,028 B2 | 2/2013 | Goldsworthy et al. |
| 8,535,033 B2 | 9/2013 | Castiglioni et al. |
| 8,857,733 B1 | 10/2014 | Galbraith et al. |
| 9,011,791 B2 | 4/2015 | Olver |
| 2003/0047718 A1 | 3/2003 | Narayan et al. |
| 2004/0016503 A1 | 1/2004 | Stowe |
| 2004/0069524 A1 | 4/2004 | Beauchamp |
| 2005/0045368 A1 | 3/2005 | Keogh |
| 2005/0239983 A1 | 10/2005 | Wille et al. |
| 2006/0264563 A1 | 11/2006 | Hanrahan et al. |
| 2007/0023735 A1 | 2/2007 | Biscoglio et al. |
| 2007/0193767 A1 | 8/2007 | Guery et al. |
| 2008/0015298 A1 | 1/2008 | Xiong et al. |
| 2009/0155570 A1 | 6/2009 | Bonnet et al. |
| 2010/0076719 A1 | 3/2010 | Lawry et al. |
| 2010/0202741 A1 | 8/2010 | Ryan et al. |
| 2010/0304270 A1 | 12/2010 | Amin-Sanayei et al. |
| 2011/0118403 A1 | 5/2011 | Wood et al. |
| 2011/0239451 A1 | 10/2011 | Montena et al. |
| 2011/0239455 A1 | 10/2011 | Montena et al. |
| 2012/0018190 A1 | 1/2012 | Smedberg et al. |
| 2012/0106591 A1 | 5/2012 | Springer, III |
| 2012/0129974 A1 | 5/2012 | DeNotta et al. |
| 2012/0186851 A1 | 7/2012 | Winterhalter et al. |
| 2012/0261158 A1 | 10/2012 | Daniel et al. |
| 2013/0167502 A1 | 7/2013 | Wilson et al. |
| 2013/0186670 A1 | 7/2013 | Person |
| 2014/0041925 A1 | 2/2014 | Davis et al. |
| 2014/0205804 A1 | 7/2014 | Jones et al. |
| 2015/0049992 A1 | 2/2015 | Bauco |
| 2015/0194240 A1 | 7/2015 | Ranganathan et al. |
| 2015/0232653 A1 | 8/2015 | Fujita et al. |
| 2016/0042837 A1 | 2/2016 | Ranganathan et al. |

FOREIGN PATENT DOCUMENTS

| | | |
|---|---|---|
| CN | 102146249 A | 8/2011 |
| CN | 102446578 A | 5/2012 |
| CN | 102977700 A | 3/2013 |
| CN | 103131274 A | 6/2013 |
| CN | 203038717 U | 7/2013 |
| DE | 3824608 C1 | 8/1989 |
| EP | 2219267 A1 | 8/2010 |
| FR | 2971617 A1 | 8/2012 |
| JP | 2000-30543 A | 1/2000 |
| JP | 2005-177572 A | 7/2005 |
| JP | 2006-104395 A | 4/2006 |
| JP | 4252875 B2 | 4/2009 |
| JP | 2010-184351 A | 8/2010 |
| JP | 2012-168330 A | 9/2012 |
| WO | 2007034248 A1 | 3/2007 |
| WO | 2010042191 A1 | 4/2010 |
| WO | 2010144520 A1 | 12/2010 |
| WO | 2013164686 A1 | 11/2013 |
| WO | 2014025420 A1 | 2/2014 |

OTHER PUBLICATIONS

Mehdaoui, Imed; Extended European Search Report, including the supplementary European search report and European search opinion; dated Jul. 5, 2017; 6 pages.

Mehdaoui, Imed; Office Action issued in European Patent Application No. 15734821.0; dated Jun. 27, 2018; 4 pages.

Modern Practical Handbook for Electrical Engineers, vol. 1; published Feb. 29, 2012; China Water & Power Press; 23 pages including citing Chinese Office Action and translation.

Young, Lee W.; International Search Report and Written Opinion of the International Searching Authority, issued in International Application No. PCT/US2016/061587; dated as dated Jan. 24, 2017; 8 pages.

Lopez, Viviana Villar; Examination Report issued in Chilean Patent Application No. 201801285; Mar. 7, 2019; 36 pages, including English translation.

Villar Lopez, Viviana; Office Action issued in Chilean Patent Application No. 201801285; dated Jul. 15, 2019; 25 pages, including partial machine translation.

CABLES COATED WITH FLUOROCOPOLYMER COATINGS

REFERENCE TO RELATED APPLICATIONS

The present application claims the priority benefit of U.S. provisional patent application Ser. No. 62/255,224, entitled CABLES COATED WITH FLUOROCOPOLYMER COATINGS, filed Nov. 13, 2015, and hereby incorporates the same application herein by reference in its entirety.

TECHNICAL FIELD

The present disclosure generally relates to cables coated with coating compositions including binder agents having a fluorocopolymer.

BACKGROUND

Various coating compositions can be applied to the outer surfaces of cables (i.e., conductors) to provide the coated cables with benefits such as improved durability and/or increased heat emissivity. These benefits can be valuable. For example, cable coatings that increase the heat emissivity of a cable can allow for transmission lines with lowered electrical resistance, increased ampacity, and improved capacity to deliver larger quantities of power to consumers. Known cable coating compositions suffer from a number of drawbacks however, including difficulty in applying the coating compositions, unimpressive heat and wet aging characteristics, and mechanical failure over time. It would therefore be desirable to provide an improved coating composition that can be easily applied to cables under ambient conditions while still exhibiting favorable mechanical properties and high emissivity.

SUMMARY

In accordance with one embodiment, a cable includes one or more conductors each having an outer surface. The cable includes a coating layer on at least a portion of the outer surface of at least one of the conductors. The coating layer includes a coating composition having a minimum film formation temperature ("MFFT") of about 20° C. or less. The coating composition includes a binder agent. The binder agent includes a fluorocopolymer and a non-fluorinated film-forming copolymer. The fluorocopolymer includes the polymerization product of vinylidene fluoride monomer and one or more unsaturated fluorinated monomers.

In accordance with another embodiment, a cable includes one or more conductors each having an outer surface. The cable includes a coating layer on at least a portion of the outer surface of at least one of the conductors. The coating layer includes a coating composition. The coating composition includes a binder agent. The binder agent includes a fluorocopolymer and a non-fluorinated film-forming copolymer. The fluorocopolymer includes the polymerization product of vinylidene fluoride monomer and one or more unsaturated fluorinated monomers. The fluorocopolymer has a second heat enthalpy of crystalline fusion value of about 40 J/g or less when measured by a differential scanning calorimeter ("DSC") in accordance to ASTM E 793-06 (2012).

In accordance with another embodiment, a method of coating a cable includes providing a cable including one or more conductors each having an outer surface, contacting at least a portion of the outer surface of at least one of the conductors with a coating composition, and drying the coating composition to form a coating layer on the cable. The coating composition is in a carrier liquid and has a minimum film forming temperature ("MFFT") of about 20° C. or less. The coating composition includes a binder agent. The binder agent includes a fluorocopolymer and a non-fluorinated film-forming copolymer. The fluorocopolymer includes the polymerization product of vinylidene fluoride monomer and one or more unsaturated fluorinated monomers.

DETAILED DESCRIPTION

Figure 1:
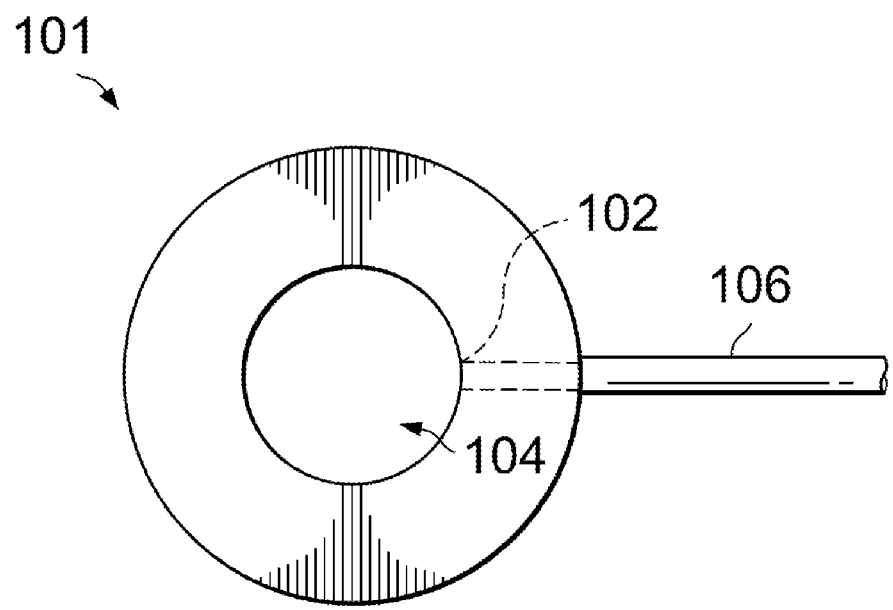
FIG. 1 illustrates a cross-sectional view of a flooded die according to certain embodiments.

The Applicant has unexpectedly found that compositions formed with a fluorocopolymer binder agent can be applied to overhead conductors and can be used as an improved coating composition. Such results were unexpected because fluorocopolymer binder agents were thought to be usable only at temperatures of about 175° C. or lower. At temperatures of about 175° C. or greater, demixing of the fluorocopolymer binder agent was expected with such demixing resulting in the failure of the coating composition. As can be appreciated, overhead conductors however, can operate at elevated temperatures of about 175° C. or more as a consequence of both ohmic heating from conductor resistance and heating from solar absorption suggesting the unsuitability of any coating composition including a fluorocopolymer binder agent. Evaluation of experimental coating compositions including a fluorocopolymer binder agent unexpectedly did not degrade, however, when subjected to temperatures greater than 175° C. Improved coating compositions including a binder agent formed with a fluorocopolymer can easily be applied to a cable (including overhead conductors) and can provide numerous benefits including improved durability and increased heat emissivity.

Suitable binder agents for the improved cable coating compositions as described herein can generally include a dispersion of a fluorocopolymer and a non-fluorinated film-forming copolymer. According to certain embodiments, a suitable binder agent can include about 50% to about 90%, by dry weight, of a fluorocopolymer and about 50% or less, by dry weight, of a non-fluorinated film-forming copolymer. In certain embodiments, a fluorocopolymer can be about 75% to about 85%, by dry weight, of the dispersion.

Fluorocopolymers suitable for inclusion into the binder agent can be polymerized from two or more unsaturated fluorinated monomers. As used herein, the term "fluorinated monomer" can mean a polymerizable alkene which contains at least one fluorine atom, fluoroalkyl group, or fluoroalkoxy group attached to the double bond of the alkene that undergoes polymerization. According to certain embodiments, about 50 mol %, or more, of a suitable fluorocopolymer can be vinylidene fluoride which polymerizes to polyvinylidene fluoride ("PVDF"). In certain embodiments, about 70 mol % to about 95 mol % of a suitable fluorocopolymer can be vinylidene fluoride. In each such embodiment, the remainder of the fluorocopolymer can be formed of one or more additional unsaturated fluorinated monomers such as trifluorochloroethylene, tetrafluoroethylene, hexafluoropropylene, vinylfluoride, perfluoroacrylic acid, and certain diene compounds such as chloroprene. A suitable fluorocopolymer can have a second enthalpy of crystalline fusion of about 40 J/g or less in certain embodiments, and a secondenthalpy of crystalline fusion of about 20 J/g or less in certain embodiments as measured in accordance to ASTM E 793-06 (2012) using a differential scanning calorimeter ("DSC"). Second heat enthalpy of crystalline fusion refers to the enthalpy value obtained by running the thermal cycle described in ASTM E793-06 (2012) twice. The first thermal cycle is run to erase the thermal history of the sample.

Non-fluorinated film-forming copolymers suitable for inclusion in a binder agent dispersion can be selected from the class of ethylenically unsaturated (vinyl) monomers miscible with the fluorocopolymer. As used herein, a film-forming polymer can generally be defined as a polymer capable of forming a continuous film when an aqueous dispersion or organic solution of the polymer is applied to a flat substrate at a wet film thickness of about 25 micrometers to about 100 micrometers and dried at temperatures of about 80° C. or less. As can be appreciated, the inclusion of non-fluorinated film-forming copolymers in a binder agent can enhance the final film-forming properties of a coating composition as disclosed herein. As can be further appreciated however, a fluorocopolymer also exhibit certain film-forming qualities independently from the non-fluorinated film-forming copolymers. As such, the selection and quantity of a film-forming copolymer can vary depending on the film-forming qualities of the fluorocopolymer selected for the binder agent.

According to certain embodiments, non-limiting examples of suitable ethylenically unsaturated (vinyl) monomers that can polymerized into a film-forming copolymer can include acrylic monomers, and methacrylic monomers with more specific examples including ethyl acrylate, methyl acrylate, butyl acrylate, propyl acrylate, isobutyl acrylate, amyl acrylate, 2-ethylhexyl acrylate, hexyl acrylate, ethyl methacrylate, methyl methacrylate, butyl methacrylate, propyl methacrylate, isobutyl methacrylate, amyl methacrylate, 2-ethylhexyl methacrylate, hexyl meth acrylate, and trifluoroethyl methacrylate. As can be appreciated, a combination of more than one non-fluorinated film-forming copolymer can also be used.

The Applicant has found that coatings formed from coating compositions including binder agents having a fluorocopolymer are more effective than similar coating compositions including binder agents that alternatively include a fluorohomopolymer. Without being bound by theory, it is believed that the improved effectiveness of binder agents including a fluorocopolymer are the result of improved film forming characteristics exhibited by the fluorocopolymers. These characteristics are in turn caused by the decreased crystallinity and increased amorphous characteristics imparted to the fluorocopolymer by the additional unsaturated fluorinated monomers. Better film forming characteristics allow for coatings with better adhesion and uniformity. In contrast, binder agents having a fluorohomopolymer formed exclusively of vinylidene fluoride have a substantially more crystalline nature with less amorphous characteristics as reflected by a higher enthalpy value. As a consequence of the predominantly crystalline nature, fluorohomopolymers exhibit poorer film-forming characteristics. As can be appreciated however, it was not believed that coating compositions could be formed with fluorocopolymer binder agents before the present disclosure as a consequence of the fluorocopolymer binder agent demixing at temperatures of about 175° C. or greater.

Suitable binder agents formed of the fluorocopolymer and the non-fluorinated film-forming copolymer can be in a carrier liquid such as an aqueous solution or a solvent-based solution. Evaporation of the carrier liquid can allow the binder agent to dry and form a film on at least a portion of the outer surface of a cable such as on a conductive metal strand of a cable. As can be appreciated, it can be advantageous for the carrier liquid to rapidly evaporate to allow for fast drying of the improved coating composition. Additionally, it can be advantageous for the carrier liquid to have a low boiling point to allow for rapid evaporation at ambient temperatures and/or for faster and more energy efficient evaporation at elevated temperatures. When aqueous carrier liquids are used, the binder agent can constitute about 40% to about 60%, by dry weight, of the dispersion.

Alternatively, the carrier liquid can be non-aqueous and can instead be an organic solvent that dissolves the binder agent. Examples of suitable organic solvents can include methyl ethyl ketone, methyl isobutyl ketone, and diethyl carbonate. As can be appreciated, other organic solvents can also be used.

Although coatings formed from compositions including binder agents dispersed in aqueous carrier liquids and non-aqueous carrier liquids are comparable, selection of additional components in an improved coating composition can be influenced by the choice of the carrier liquid. For example, coating compositions including binder agents dispersed in aqueous solutions can have lower volatile organic chemical ("VOC") levels than coating compositions having a comparable organic solvent based carrier liquid for the binder agent. As can be appreciated, other components included in a coating composition, such as a pigment dispersion, must also be compatible with the carrier liquid (e.g., be colloidally stable with the carrier liquid).

Suitable binder agents and coating compositions as described herein can be characterized by a Minimum Film Formation Temperature ("MFFT"). The MFFT is the lowest temperature at which a binder agent or composition form a continuous film. A MFFT can be measured on a gradient temperature instrument in accordance to ASTM D 2354-10 (2012). An example of a suitable gradient temperature instrument is the "MFFT Bar II" produced by Paul Gardner, Inc. Generally, an improved coating composition including a binder agent can be applied to a cable at temperatures above the MFFT of the composition. For example, an improved coating composition having an MFFT of 5° C. can be applied to a cable and dried at ambient temperatures at or above about 5° C. As can be appreciated, both the binder agent and the composition can have respective MFFT values. In certain embodiments, a suitable binder agent can exhibit an MFFT of about 25° C. or less in certain embodiments, an MFFT of about 15° C. or less in certain embodiments, an MFFT of about 5° C. or less in certain embodiments, or an MFFT of about 2° C. or less in certain embodiments.

For increased usability, the MFFT of a coating composition can be lowered in certain embodiments through inclusion of a suitable coalescing agent into the coating composition. Such coalescing agents can generally be selected from slow evaporating solvents having elevated boiling points between, for example, about 160° C. to about 240° C. Non-limiting examples of suitable coalescing agents can include dipropylene glycol methyl ether, dipropylene glycol methyl ether acetate, dipropylene glycol n-butyl ether, ethylene glycol n-butyl ether, Texanol® ester-alcohol (Eastman Chemical Co.), and dipropylene glycol dimethyl ether. When included, a coalescing agent can be added in quantities sufficient to lower the MFFT of an improved coating composition to a suitable value for application onto a cable. In certain embodiments, the coalescing agent can be about 7% or less of an improved coating composition, about 5% or less of an improved coating composition, about 3% or less of an improved coating composition, or about 1.5% or less of an improved coating composition. As can be appreciated however, the lowest necessary quantity of a coalescing agent necessary to reach a suitable MFFT may be desired to allow for faster drying times and to ensure that the VOC of the coating composition remains below any applicable limits. Selection of an MFFT value as high as possible for the coating conditions (e.g., just below ambient conditions at the time of coating) may also be desired to allow for the formation of better coatings by hindering the incorporation of contaminants such as dirt into the coating. A higher MFFT will be less tacky and prevent contamination of the coating composition. In certain embodiments including a binder agent with a sufficiently low MFFT, no coalescing agent may be necessary for a coating composition. Examples of suitable MFFT values for an improved coating composition as described herein can include an MFFT of about 25° C. or less in certain embodiments, an MFFT of about 15° C. or less in certain embodiments, an MFFT of about 5° C. or less in certain embodiments, and an MFFT of about 2° C. or less in certain embodiments. As can be appreciated, such MFFT values can affect the minimum temperatures at which the coating compositions can be applied to a cable.

In certain embodiments, the use of a coalescing agent can alternatively allow for coating compositions to be formed from binder agents formed from fluorohomopolymers and not fluorocopolymers.

In certain embodiments, a desired binder agent can include additional components. For example, the non-fluorinated film-forming copolymer can include additional unsaturated non-fluorinated comonomers to improve the coating properties of the improved binder agent. Non-limiting examples of additional unsaturated non-fluorinated comonomers can include one or more a, B unsaturated carboxylic acids (e.g. acrylic acid, methacrylic acid, fumaric acid, crotonic acid, itaconic acid); vinyl phosphonic and vinyl sulfonic acids, vinyl ester compounds, vinyl ether compounds, amide compounds (e.g., acrylamide, methacrylamide, N-methylmethacrylamide, N-methylolmethacrylamide, N-alkylacrylamide, N-alkylacryl methamide, N-dialkyl methacrylamide, N-dialkyl acrylamide); monomers containing hydroxyl groups (e.g., hydroxyethyl methacrylate, hydroxyethyl acrylate, hydroxypropyl acrylate, hydroxypropyl methacrylate, and diethylene glycol ethyl ether acrylate); monomers containing epoxy groups (e.g., glycidyl acrylate, and glycidyl methacrylate), monomers containing silanols (e.g., γ-trimethoxysilane methacrylate, and γ-triethoxysilane methacrylate); monomers containing aldehydes (e.g., acrolein), alkenyl cyanides (e.g., acrylonitrile, and methacrylonitrile), and other types of functional monomers such as acetoacetoxyethyl methacrylate.

Additional details about binder agents are disclosed in U.S. Patent Application Publication No. 2011/0118403 A1 which is hereby incorporated by reference.

In addition to a binder agent, an improved coating composition described herein can further include additional components such as one or more plasticizers, fillers, pigments, thickeners, crosslinking agents, and defoamers. Additionally, or alternatively, an improved coating composition can also include an additional carrier liquid. In such embodiments, the additional carrier liquid can generally be the same, or miscible, with the carrier liquid used to disperse the binder agent. When the carrier liquid is aqueous, the total dry solids weight content of an improved coating composition can be about 20% or more in certain embodiments, and about 40% or more in certain embodiments. In embodiments employing an organic solvent as a carrier liquid, the total dry solids weight content can be about 30% or less in certain embodiments, and between about 15% to about 30% in certain embodiments.

Plasticizers can optionally be included to provide for improved film formation and for improved flexibility of the dried coating. Generally any suitable plasticizer can be used in the described coating compositions. For example, aqueous based coating compositions disclosed herein can include Optifilm™ 400 plasticizer commercially obtained from Eastman Chemical Company. As can be appreciated, a plasticizer can exhibit similar qualities as a coalescing agent and can, for example, reduce the MFFT of a coating composition. Plasticizers can generally be distinguished from coalescing agents, however, by exhibiting a higher boiling point such as a boiling point of about 240° C. or more. When included, a plasticizer can be included in relatively small quantities such as about 0.1% to about 2.0% by weight of the improved coating composition.

In certain embodiments, filler can be included in an improved coating composition to further tailor the properties of the coating composition. For example, filler can be included to increase the solids content of an improved coating composition (e.g., to allow for faster drying of the composition), to decrease the tackiness of an improved coating composition, or to increase the emissivity of an improved coating composition. Fillers can also impart anti-blocking properties to the improved coating compositions described herein. Anti-blocking fillers such as talc and calcined clay can decrease the likelihood of a coating composition adhering to the polymers of an adjacent layer. Additionally, fillers can also influence the surface properties of the coating layer. For example, talc has a planar geometry and can cause the formation of a smoother coating layer surface. Generally a variety of fillers can be included to achieve one or more of these improvements including mineral fillers such as calcined clay and talc.

Specific examples of fillers that can increase heat emissivity can include metal oxides, metal nitrides, metal fluorides, rare earth elements, and metal carbides such as, but not limited to, gallium oxide, cerium oxide, zirconium oxide, silicon hexaboride, carbon tetraboride, silicon tetraboride, silicon carbide, molybdenum disilicide, tungsten disilicide, zirconium diboride, zinc oxide, cupric chromite, magnesium oxide, silicon dioxide, chromium oxides, iron oxide, boron carbide, boron silicide, copper chromium oxide, titanium dioxide, aluminum nitride, boron nitride, alumina, and combinations thereof. Suitable rare earth materials can include one, or more, of a rare earth oxide, a rare earth carbide, a rare earth nitride, a rare earth fluoride, or a rare earth boride. Examples of rare earth oxides include scandium oxide, yttrium oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, and lutetium oxide. Examples of rare earth carbides include scandium carbide, yttrium carbide, cerium carbide, praseodymium carbide, neodymium carbide, samarium carbide, europium carbide, gadolinium carbide, terbium carbide, dysprosium carbide, holmium carbide, erbium carbide, thulium carbide, ytterbium carbide, and lutetium carbide. Examples of rare earth fluorides include scandium fluoride, yttrium fluoride, cerium fluoride, praseodymium fluoride, neodymium fluoride, samarium fluoride, europium fluoride, gadolinium fluoride, terbium fluoride, dysprosium fluoride, holmium fluoride, erbium fluoride, thulium fluoride, ytterbium fluoride, and lutetium fluoride. Examples of rare earth borides include scandium boride, yttrium boride, lanthanum boride, cerium boride, praseodymium boride, neodymium boride, samarium boride, europium boride, gadolinium boride, terbium boride, dysprosium boride, holmium boride, erbium boride, thulium boride, ytterbium boride, and lutetium boride.

In certain embodiments, a suitable filler can also be selected from electrically conductive fillers such as carbon nanotubes, graphene, and graphite. Such electrically conductive fillers can, in sufficient quantities, make a coating formed from the improved coating composition conductive or semi-conductive. Such fillers can also improve the heat-transfer properties of the coating.

In certain embodiments, the filler can have an average particle size of about 25 microns or less, and in certain embodiments, about 10 microns or less, in certain embodiments, 500 nanometers or less. Suitable fillers can optionally be included in the coating at less than about 50% by weight, in certain embodiments about 2% to about 30% by weight, and in certain embodiments included at about 5% to about 20% by weight.

For ease of application and processability, it can be advantageous to include a thickener or rheology modifier in certain embodiments. Generally, any suitable thickener can be used including commercially obtained thickeners such as Acrysol® RM-8W from the Dow Chemical Company. In certain embodiments, a thickener or rheology modifier can be included to modify the viscosity of an improved coating composition to about 15 sec to about 25 sec as measured using a Zahn cup #3 in certain embodiments, or to about 19 sec to about 23 sec in certain embodiments.

As can be appreciated, it can be useful to tailor the viscosity profile of an improved coating composition for a variety of reasons. For example, the viscosity profile can determine the suitability of various coating methods such as the use of a flooded die or a spray process. The viscosity profile can also be important to the speed of the coating process as well as the thickness and quality of the dried coating layer formed from the coating composition. As can be appreciated, in addition to the use of a thickener or rheology modifier, the viscosity profile of an improved coating composition as described herein can also be modified through the dry solids content and quantity of the carrier liquid.

An improved coating composition described herein can be gray to light gray in appearance without the addition of a pigment or color agent. As can be appreciated, the addition of a pigment into a coating composition can allow a coating formed of the coating composition to exhibit improved thermal properties by decreasing the solar absorptivity of the coating. For example, a coating composition incorporating a white pigment (such as titanium dioxide in a rutile phase) can form coatings that reflect incident solar radiation. Cables coated with such improved coating compositions can operate at a lower temperature than a comparable cables coated with a non-white coating. Non-limiting examples of suitable aqueous pigment dispersions are depicted in Table 1 below. As can be appreciated however, other pigment dispersions including commercially available pigment dispersions can alternatively be used and similar pigment dispersions can be formed for non-aqueous coating compositions.

In certain embodiments, an improved coating composition can also be substantially transparent in appearance without the addition of a pigment or color agent. As can be appreciated, such coating compositions can also exhibit excellent thermal properties by allowing for the greater reflectance of heat away from the underlying metallic conductor.

Non-limiting examples of additional pigments that can be included in other pigment dispersions can include anatine, brookite, cadmium yellow, cadmium red, cadmium green, orange cobalt, cobalt blue, cerulean blue, aureolin, cobalt yellow, copper pigments, azurite, Han purple, Han blue, Egyptian blue, malachite, Paris green, phthalocyanine blue BN, phthalocyanine green G, verdigris, viridian, iron oxide pigments, sanguine, caput mortuum, oxide red, red ochre, Venetian red, Prussian blue, clay earth pigments, yellow ochre, raw sienna, burnt sienna, raw umber, burnt umber, marine pigments (e.g., ultramarine, and ultramarine green shade), and zinc pigments (e.g., zinc white, and zinc ferrite).

TABLE 1

| Component | Function | Tan Pigment dispersion | White pigment dispersion 1 | Gray pigment dispersion | White Pigment dispersion 2 |
|---|---|---|---|---|---|
| Water | Solvent | 1.7 | 15.9 | 9.03 | 7.5 |
| Propylene Glycol | Solvent | 2 | — | — | — |
| Potassium tripolyphosphate | pH control agent | 0.2 | 0.1 | 0.04 | — |
| Strodex ® PK 0 VOC | Wetting agent | — | 1 | 0.6 | — |
| Disperbyk ® 190 (Altana) | Carrier liquid | 0.4 | 1.6 | 1.7 | — |
| Hydropalat 3275 | Carrier liquid | — | — | — | 1.5 |
| Natrosol ® 250 MBR | Thickener | — | 0.4 | — | — |
| Tegofoamex ® 825 (Evonik) | Silicone emulsion defoamer | 0.2 | 0.07 | 0.07 | 0.1 |
| Shepherd Brown 157 mineral pigment (Shepherd Color Company) | Tinting pigment | 2.7 | — | — | — |

TABLE 1-continued

| Component | Function | Tan Pigment dispersion | White pigment dispersion 1 | Gray pigment dispersion | White Pigment dispersion 2 |
|---|---|---|---|---|---|
| Duramite ® Calcium Carbonate | Pigment extender | — | 15.2 | — | — |
| Shepherd 30C965 black mineral pigment (Shepherd Color Company) | Tinting pigment | — | — | 0.82 | — |
| Talc (399 mesh) | Pigment extender | — | — | 7.94 | — |
| Rutile TiO2, pigmentary grade | White mineral pigment | 10.8 | 15.2 | 18.6 | 15 |
| Total | | 18 | 49.47 | 38.8 | 24.1 |

An improved coating composition can optionally include a crosslinking agent to provide for increased mechanical strength of the coating. As can be appreciated, suitable crosslinking agents can be nucleophilic and can begin crosslinking upon addition of the crosslinking agent to the composition or can be activated by applied heat in a drying step. An example of a suitable crosslinking agent is polyisocyanate such as waster-dispersible Bayhydur® XP-2655 obtained from Bayer MaterialScience. Alternatively, if a thermoset coating composition is desired, crosslinking can also be provided using a radiation curing process such as e-beam curing. As can be appreciated, radiation curing process can be performed inline or in secondary processes.

A defoamer can be included in certain embodiments to inhibit or retard the formation of foam in a coating composition. Suitable examples of defoamers can include silicon-based antifoam agents and non-silicon-based antifoam agents. In certain embodiments, a surfactant can also be used as a defoamer. Suitable surfactants include, but are not limited to, cationic, anionic, or non-ionic surfactants, and fatty acid salts. As can be appreciated, commercial defoaming agents such as Byk® 022 from Altana AG can also be incorporated. A defoamer can be added at about 0.1% to about 5% by weight of an improved coating composition.

An improved coating composition as disclosed herein can exhibit numerous beneficial qualities including ease-of-application onto a cable, and excellent mechanical and electrical properties. For example, coatings formed on metal plaques from the described compositions can exhibit less than 1 crack or adhesion defect per 100 cm² and can pass a 6 mm Mandrel Bend Test.

For example, in certain embodiments, an improved coating composition as disclosed herein can decrease the operating temperature of a conductor. As can be appreciated, the temperature of a conductor is dependent on a number of influences including the electrical properties of the conductor, the physical properties of the conductor, the operation of the conductor, and local weather conditions. Decreasing the operating temperature of a conductor can allow for a given conductor to conduct a greater amount of power than a similar conductor operating at a higher temperature. The operating temperature of a conductor can be decreased by limiting heating of the conductor due to factors other than the use of the cable and by increasing the rate of cooling.

One such factor is the conductor's absorption of solar radiation from the sun. The amount of heat absorbed from solar radiation is dependent on conductor's surface's coefficient of absorptivity ("absorptivity") with a low absorptivity indicating that the conductor absorbs only a small amount of heat due to solar radiation. An improved coating agent including a binder agent as described herein can have a solar absorptivity of about 0.5 or less in certain embodiments, and a solar absorptivity of about 0.3 or less in certain embodiments.

Likewise, a conductor can be cooled through emission of heat through convection, conduction, or radiation. The amount of heat radiated through such emissive properties is dependent on the conductor surface's coefficient of emissivity ("emissivity") with a high emissivity indicating that the conductor is radiating more heat than a conductor with a low emissivity. An improved coating composition including a binder agent as described herein can have an emissivity of about 0.7 or more in certain embodiments, and an emissivity of about 0.9 or more in certain embodiments.

As can be appreciated, cables coated with improved coating compositions exhibiting such solar absorptivity and emissivity values can operate at lower temperatures than comparable cables constructed without such a coating agent. For example, cables including a coating layer formed from an improved coating composition can operate at a temperature at least about 15% cooler than a comparable cable constructed without such a coating composition in certain embodiments, and can operate at least about 20% cooler in certain embodiments; and can operate at least about 22% cooler in certain embodiment.

The improved coating compositions can also form coatings of excellent mechanical quality on cables. For example, when applied on a cable or conductor, an improved coating composition as described herein can form a crack-free continuous film coating having a uniform thickness between about 2 microns and about 60 microns in certain embodiments, and a thickness between about 5 microns and 30 microns in certain embodiments.

Advantageously, the coating can be applied under ambient conditions without the use of external heat in certain embodiments. Specifically, a coating composition as described herein can be applied at temperatures at, or greater than, the MFFT of such a coating composition and can dry under ambient conditions. For example, a coating composition applied to a 100 cm² aluminum test panel at about 20° C. can form a smooth and continuous film when allowed to dry at 20±3° C. for one week.

Coatings formed from the coating compositions described herein can demonstrate good attachment and durability. For example, samples coated with such coating compositions can pass a 6 mm Mandrel Bend Test. As defined herein, a sample can pass a Mandrel Bend Test by being bent around mandrels of decreasing diameter and determining that the coating on the evaluated sample exhibits no signs of detachment, cracking, or other damage. A sample can pass a 6 mm Mandrel Bend Test when the smallest evaluated mandrel is 6 mm in diameter or less.

The coatings formed from the improved coating compositions can also pass other mechanical tests. For example, coated metal substrates can be resistant to salt damage as demonstrated by the ability of a sample to avoid corrosion damage after a 1,000 hour salt spray test when measured in accordance with ASTM B 117. Additionally, samples can pass an abrasion test as well as a tape adhesion test in accordance to ASTM D 3359 (2009). The abrasion test evaluated the ability of an overhead coated conductor sample to withstand damage caused by silicon carbide 800/2400 grit sandpaper wrapped around a 2"×1"×1.75" metal block that was moved up and down the length of a 1 foot sample for ten up and down cycles. The metal block was moved without application of any vertical force. A sample passed the abrasion test when a visual inspection of the sample did not observe any underlying aluminum caused by abrasion of the coating layer. As can be appreciated, the coatings formed from the improved coating composition can also be expected to have a long life span as a consequence of using a binder agent as described herein. Specifically, PVDF which forms more than 50% of the binder agents as described herein, has a known lifespan of more than 20 years.

Cable coatings formed from an improved coating composition can also demonstrate good mechanical properties after artificial aging. As can be appreciated, artificial aging processes subject a sample to elevated temperatures and/or water submersion to simulate the expected physical condition of a sample after an extended lifetime of typical usage. Cables including a coating formed from an improved coating composition as described herein were artificially aged using heat aging at 180° C. for 45 days and at 225° C. for 45 days. The heat aged cables demonstrated their mechanical durability by resisting abrasion damage and by passing a 6 mm Mandrel Bend Test. Cable samples were also subjected to water aging by being submerged in 90° C. water for 30 days. The water aged cables also demonstrated their mechanical durability by resisting damage on an abrasion test and by passing a 6 mm Mandrel Bend Test. These results were unexpected because the heat aging was expected to cause demixing of the fluorocopolymer binder agent.

The improved coating compositions described herein can be produced in a high-speed disperser ("HSD"), ball mill, bead mill or other machine using techniques known in the art. For example, in certain embodiments, each of the liquid components can be introduced into a HSD and mixed. Dry components such as the filler can then be added and mixed to produce an improved coating composition.

As can be appreciated, a variety of cables can be coated with the compositions described herein including solid and stranded cables. In certain embodiments, the cable to be coated can be an overhead conductor cable such as, for example, aluminum conductor steel reinforced ("ACSR") overhead conductors, aluminum conductor steel supported ("ACSS") overhead conductors, aluminum conductor composite core ("ACCC") overhead conductors, and aluminum alloy conductor ("AAAC") overhead conductors. In certain embodiments, a suitable cable can also be a gap conductor cable. A gap conductor cable can include a high-strength steel core surrounded by trapezoidal shaped temperature resistant aluminum zirconium wires.

In certain embodiments, the surface of a cable can be prepared prior to the application of an improved coating composition. Exemplarily preparation processes can include chemical treatment, pressurized air cleaning, hot water or steam cleaning, brush cleaning, heat treatment, sand blasting, ultrasound, deglaring, solvent wipe, plasma treatment, and the like. Additionally, in certain embodiments, a primer can be applied to the surface of a cable before the addition of an improved coating composition as described herein. Suitable primers can act as a base coat for the cable. Examples of suitable primers can include acrylics, polyesters, epoxy, vinyl acrylics, ethylene-vinyl acetate polymers, alkyds, plastisols, and poly(vinyl butyral). In certain embodiments, it can be useful for the surface preparation process to produce a clean but rough surface. A rough surface can increase the adhesion strength of the improved coating composition to the cable. In certain embodiments, a suitable surface preparation process can produce variations in the surface depth of the conductor surface of about 3 microns or more.

In certain embodiments, the improved coating compositions described herein can be applied without a chemical pretreatment process. For example, in such embodiments, the described coating compositions can be applied directly to newly manufactured cables or to pre-installed overhead conductors without a chromate treatment. Instead, the described coating compositions can be applied directly to the cable without requiring more than mechanical cleaning from, for example, brush cleaning or sand blasting. In certain embodiments, improved coating compositions applied without a chemical pretreatment can directly contact the underlying conductor or substrate. As can be appreciated, the absence of a chemical pretreatment process can substantially improve the process for applying a coating to an existing overhead conductor cable. Cables covered with oil or grease may require removal of the oil or grease before application.

A coating composition can be applied by a spray gun in certain embodiments. The spray gun can apply the improved coating composition using a pressure of about 10 psi to about 45 psi. In such embodiments, the spray gun nozzle can be placed perpendicular (e.g., at about 90°) to the longitudinal direction of the cable to obtain a uniform coating of the coating composition on the cable. In certain embodiments, two or more spray guns can be used to obtain more efficient, or more uniform, coatings. As can be appreciated, electrostatic spray guns can also, or alternatively, be used in certain embodiments. The coating thickness and density can be controlled by the admixture viscosity, gun pressure, and conductor line speed. During the coating application, the overhead conductor temperature can be maintained between about 0° C. to about 90° C.

Alternatively, an improved coating composition can be applied to a cable by one or more of dipping, a brush, or a roller. In embodiments dipping a conductor, a cleaned and dried conductor can be dipped into the improved coating composition to allow the coating composition to completely coat the conductor.

Figure 2:
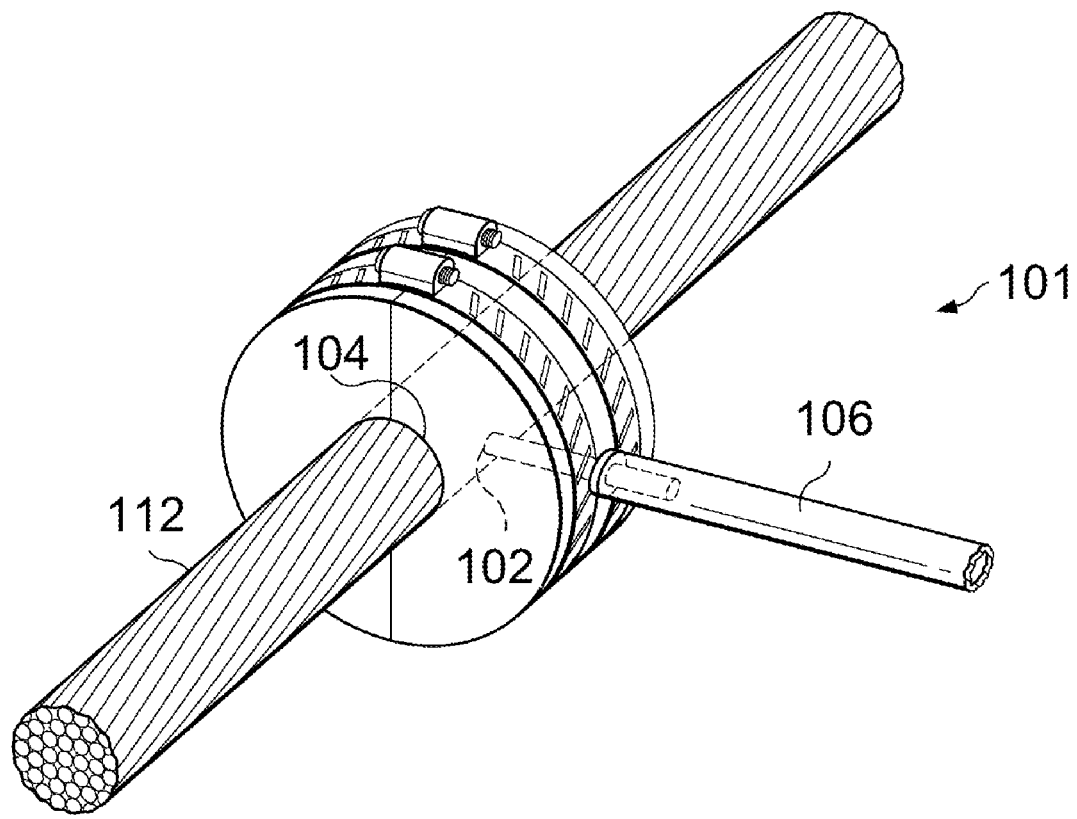
FIG. 2 depicts a plan view of a flooded die in accordance with certain embodiments.
Figure 3:
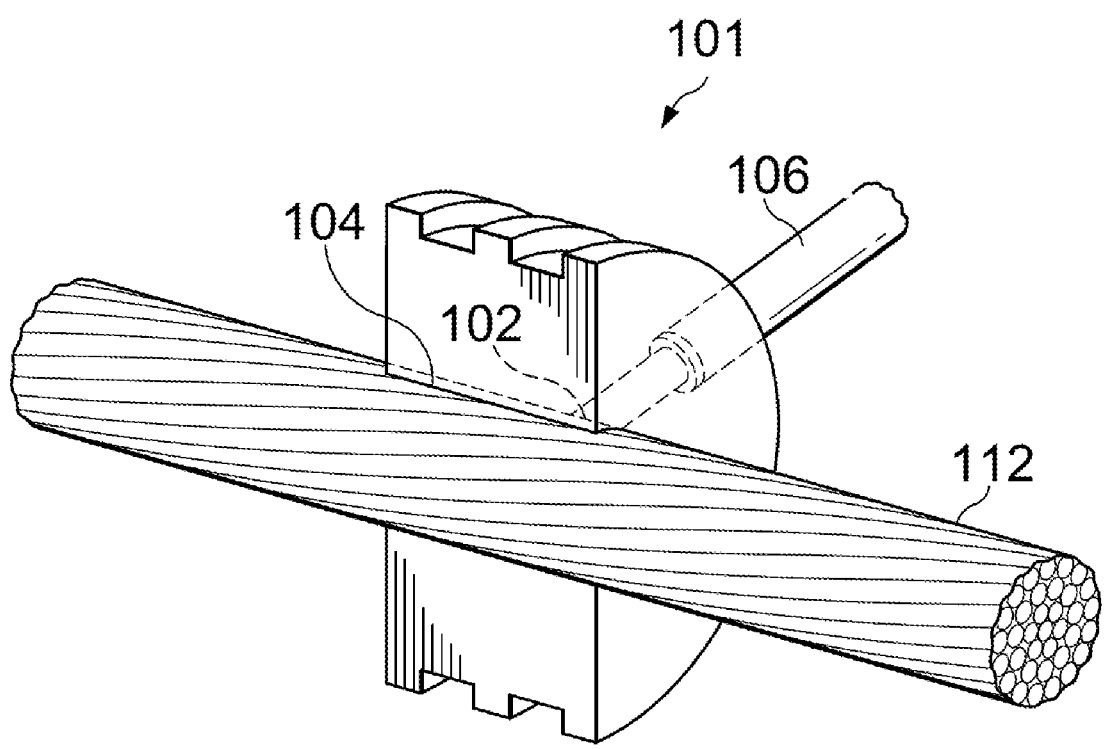
FIG. 3 illustrates a cut-away view of a flooded die according to certain embodiments.

In certain embodiments, an improved coating composition can also be applied to a cable using a flooded die that deposits the improved coating composition on the cable. An example of an annular-shaped flooded die is depicted in FIGS. 1 to 3. The flooded die 101 includes a tube 106 to receive the improved coating composition. As a conductor 112 passes through a central opening 104 of the flooded die 101, the improved coating composition coats the conductor 112 via one or more opening ports 102 in the inner surface of the flooded die 101. In certain embodiments, the flooded die 101 can include two or more, four or more, or six or more, opening ports 102 evenly spaced around the circumference of the inner surface of the die 101. In certain embodiments, once the conductor 112 exits the flooded die, it can pass through an air wipe to remove excess quantities of the improved coating composition and to spread the coating composition evenly around the cable 112. In the case of stranded cables, the air wipe can also allow the improved coating composition to penetrate the grooves between the strands on the surface of the cable 112.

After application of the coating composition onto at least a portion of an outer surface of a conductor, the coating on the overhead conductor can be dried through evaporation either at room temperature or at elevated temperatures. In certain embodiments, the coating composition can be dried with a heating method. In such embodiments, an oven can be heated up to about 200° C., or in certain embodiments, from about 80° C. to about 150° C. In other certain embodiments, heat can alternatively be applied through hot air heating, induction heating, or infrared ("IR") heating. In certain embodiments, the step of drying and curing the coating composition can be followed by additional drying processes. As can be appreciated, the use of elevated temperatures can substantially reduce the drying time of the improved coating composition. For example, the use of elevated temperatures can reduce the drying time to about 5 minutes or less in certain embodiments, or about 1 minute or less in certain embodiments.

The process of drying and/or curing can take place in a continuous or batch manner. When the drying and curing process is run continuously, a cable can exit the coating step, and continuously enter an air knife and curing process. Alternatively, in a batch manner process, the curing step can be performed on individual sections of a cable. As illustrative examples, in a batch process, after initial drying, a coated cable can be wound on to a bobbin, which can subsequently be transferred to an oven. In continuous production, a cable can instead be wound on a bobbin after continually transferring through a heated oven heated to about 50° C. to about 200° C., in certain embodiments at about 80° C. to about 150° C., for about 0.1 hour to about 24 hours in certain embodiments, and from about 1 hour to about 15 hours in certain embodiments. As can be appreciated however, in certain embodiments, no heating is necessary to dry the coating compositions disclosed herein and a cable in such embodiments can instead be allowed to dry at ambient temperatures such as at temperatures of about 23° C. or even less.

As can be appreciated, the coating composition can also be used with overhead conductors which are already installed and are currently in use. Existing conductors can, in certain examples, be coated using a robotic system for automated or semi-automated coating. The automated system functions in three steps including the steps of (1) cleaning the conductor surface; (2) applying a coating on the conductor surface; and (3) drying the coating. As can be further appreciated a coating composition can also be used with overhead transmission line accessories including, for example, transformers, insulators, dead-ends/termination products, splices/joints, products, suspension and support products, motion control/vibration products "dampers", guying products, wildlife protection and deterrent products, conductor and compression fitting repair parts, substation products, clamps and other transmission and distribution accessories. Such products can be commercially obtained from a variety of manufacturers including Preformed Line Products (PLP) of Cleveland, Ohio and AFL of Duncan, S.C.

As can be appreciated, a coating can be applied to a conductor, or other substrate, in a variety of ways. The coating, for example, can be applied by coating the individual wires before their assembly in a bare overhead conductor in certain embodiments. In such embodiments, all of the wires of the conductor can be coated, or only selective wires can be coated. As can be appreciated, it can be advantageous in terms of time, material, or the like to coat only the outer-most wires of a conductor. Alternatively, the coating can be applied only to the outer surface of a bare overhead conductor. In one embodiment, the complete outer surface of a bare conductor can be coated, or in other embodiments only a portion of the bare conductor can be coated.

A continuous process can be utilized for both stranded conductors and individual strands that can later be stranded together with other strands to form a conductor. A continuous coating process can operate at a line speed from about 10 ft/min to about 250 ft/min, in certain embodiments; and at a line speed from about 40 ft/min to about 150 ft/min, in certain embodiments.

A coating can also, or alternatively, be used in composite core conductor designs. Composite core conductors are useful due to their lower sag at higher operating temperatures and higher strength to weight ratio. Reduced conductor operating temperatures due to a coating can further lower sag of the conductors and lower degradation of polymer resin in the composite. Examples for composite cores can be found, e.g., in U.S. Pat. Nos. 7,015,395, 7,438,971, and 7,752,754, which are each incorporated herein by reference.

Once coated onto a conductor and dried/cured, the coating formed by the improved coating composition can have a thickness of about 100 microns or less in certain embodiments, and in certain embodiments a thickness of about 2 microns to about 50 microns. As can be appreciated, the complete outer surface of a bare conductor can be coated in certain embodiments while in other embodiments only a portion of the outer surface of a bare conductor can be coated.

Examples

Table 2 depicts several coating compositions including an aqueous binder agent. Examples 1 to 7 are Inventive Examples and depict coating compositions incorporating fluorocopolymer binder dispersions. Examples 8 and 9 are Comparative Examples and produce film coatings exhibiting poor qualities. Each of the pigment dispersions utilized in Table 2 are the pigment dispersions disclosed in Table 1.

The Binder Agents in Table 2 were formed of a fluorocopolymer and acrylic copolymers. The fluorocopolymer in each Binder Agent includes 89 mol % vinylidene fluoride and 11% hexafluoropropylene and had an overall enthalpy of crystalline fusion of 18 J/g. Binder Agent 1 included 70% fluorocopolymer and 30% acrylic copolymer, and had a 44% dry weight solids content and an MFFT of 26° C. Binder Agent 2 included 50% fluorocopolymer and 50% acrylic copolymer, and had a 46% dry weight solids content and an MFFT of 12° C. Binder Agent 3 included 70% fluorocopolymer and 30% acrylic copolymer, and had a 44% dry weight solids content and an MFFT of 15° C. Binder Agent 4 included 50% fluorocopolymer and 50% acrylic copolymer, and had a 50% dry weight solids content and an MFFT of 8° C.

TABLE 2

| Component | 1 | 2 | 3 | 4 | 5 | 6 | 7 | 8 | 9 |
|---|---|---|---|---|---|---|---|---|---|
| Binder Agent 1 | 74.6 | — | — | — | — | 90 | — | 75.9 | 99 |
| Binder Agent 2 | — | 45.3 | — | — | — | — | — | — | — |
| Binder Agent 3 | — | — | 56.4 | — | — | — | — | — | — |
| Binder Agent 4 | — | — | — | 75.9 | 72.9 | — | 99 | — | — |
| Tan Pigment dispersion | 18 | — | — | — | — | — | — | — | — |
| White Pigment dispersion 1 | — | 49.4 | — | — | — | — | — | — | — |
| Gray Pigment dispersion | — | — | 38.8 | — | — | — | — | — | — |
| White Pigment dispersion 2 | — | — | — | 24 | 24 | — | — | 24 | — |
| Dipropylene glycol methyl ether | 5.2 | — | — | — | — | 7 | — | — | — |
| Dipropylene glycol methyl ether acetate | 1.6 | — | — | — | — | — | — | — | — |
| Dipropylene glycol n-butyl ether | — | 1.5 | — | — | 3 | 2 | — | — | — |
| Dipropylene glycol dimethyl ether | — | — | 1.25 | — | — | — | — | — | — |
| Optifilm ® 400 (Eastman Chemical) | — | 3.2 | — | — | — | — | — | — | — |
| Acrysol ® RM-8W, (Dow Chemical) | 0.6 | 0.5 | 0.3 | — | — | 0.9 | 0.9 | — | 0.9 |
| Byk ® 022 (Altana) | — | 0.1 | 0.1 | 0.1 | 0.1 | 0.1 | 0.1 | 0.1 | 0.1 |
| Bayhydur ® XP-2655 (Bayer MaterialScience) | — | — | 3.15 | — | — | — | — | — | — |
| Total | 100 | 100 | 100 | 100 | 100 | 100 | 100 | 100 | 100 |
| MFFT (° C.) | <2 | <2 | <2 | 6 | <2 | <2 | 8 | 22 | 25 |
| Coating thickness (mil) | 1.1 | 1.16 | 1.37 | 1.15 | 0.95 | 1.11 | 1.08 | 1.2 | 1.1 |
| Solar reflectance (%) | 61 | 75 | 58 | 70 | — | — | — | — | — |
| Film Quality | | | | Excellent | | | | Very poor | |
| Mandrel Bend Test (6 mm mandrel at 23° C.) | | | | Pass | | | | Fail | |

Each of the Inventive Examples 1 to 7 exhibited excellent film coatings when dried on metal plaques. For example, each of the Inventive Examples 1 to 7 had less than 1 crack or adhesion defect per 100 cm$^2$ and passed a 6 mm Mandrel Bend Test. Comparative Examples 8 and 9 having significantly higher MFFT temperatures, had very poor film coatings with more than a 100 cracks or adhesion defects per 100 cm$^2$ and failed the 6 mm Mandrel Bend Test.

Table 3 depicts Examples 10 to 13 which are solvent-based coating compositions. Examples 10 and 11 are Inventive Examples and depict coating compositions formed with binder agents having a fluorocopolymer. Examples 12 and 13 are Comparative Examples and include a PVDF homopolymer binder agent.

Examples 10 to 13 were produced by first forming a pigment dispersion in a bead mill and then performing a letdown with a binder dispersion consisting of fluoropolymer and additional solvent. Continuous bead milling was performed throughout both steps. The pigment dispersion and binder dispersion of each of Examples 10 to 13 are depicted in Table 3.

Fluorocopolymer 1 included 91 mol % vinylidene fluoride and 9 mol % hexafluoropropylene and had a crystalline enthalpy of fusion of 26 J/g. Fluorocopolymer 2 included 74 mol % vinylidene fluoride, 19% tetrafluoroethylene, and 7% hexafluoropropylene. Fluorocopolymer 2 had a crystalline enthalpy of fusion of 22 J/g.

TABLE 3

| Component | Example 10 | Example 11 | Example 12 | Example 13 |
|---|---|---|---|---|
| Pigment Dispersion | | | | |
| Acrylic Resin (Paraloid ® B-44, Dow Chemical Co.) | 32.6 | 32.6 | 32.6 | 32.6 |
| Methyl ethyl ketone | 49 | 49 | 49 | 49 |
| Methyl isobutyl ketone | 150 | 150 | 150 | 150 |
| Rutile TiO$_2$ (TiPure ® R960, Dow Chemical Co.) | 81.6 | 81.6 | 81.6 | 81.6 |
| Talc (399 mesh) | 34.8 | 34.8 | 34.8 | 34.8 |

TABLE 3-continued

| Component | Example 10 | Example 11 | Example 12 | Example 13 |
|---|---|---|---|---|
| Binder Dispersion | | | | |
| Fluorocopolymer 1 | 76 | — | — | — |
| Fluorocopolymer 2 | — | 76 | — | — |
| KYNAR 500 ® PVDF homopolymer from Arkema, Inc. (Crystalline Enthalpy of fusion 51 J/g) | — | — | 76 | 76 |
| Methyl ethyl ketone | 103 | 103 | 103 | 103 |
| Dipropylene glycol methyl ether | — | — | — | — |
| N-methyl pyrrolidinone | 103 | — | 103 | — |
| Dimethyl carbonate | — | 103 | — | 103 |
| Total | 630 | 630 | 630 | 630 |
| Film quality after drying at 20 + −2° C. (crack or adhesion defects/100 cm²) (Excellent: <1; Good <3; Poor >10; very poor >100) | Excellent | Excellent | Very poor | Excellent |
| Coating thickness (mil) | 0.76 | 0.40 | Not uniform | 0.75 |
| Mandrel Bend Test (6 mm Mandrel at 23° C.) | Pass | Pass | Fail | Fail |

Inventive Examples 10 and 11 exhibited excellent mechanical properties while each of Comparative Examples 12 to 14 failed the 6 mm Mandrel Bend Test. As can be appreciated, Comparative Examples 12 and 13 included an acrylic copolymer and still failed demonstrating the importance of a fluorocopolymer over a PVDF homopolymer.

Table 4 depicts the effect of viscosity on coating qualities using the coating composition of Example 1 previously described in Table 2. The coating qualities evaluated include coating spreadability, film quality, and coating thickness. Spreadability was determined by evaluating if an air knife could cover more than 80% of a 100 cm² substrate in 30 seconds or less. Film quality was determined using the parameters disclosed in Table 3. The viscosity of the compositions in Table 4 were modified through the addition of water to modify the solids content of identical coating compositions. As can be appreciated, thickeners and rheology modifiers can alternatively be used to modify the viscosity.

TABLE 4

| Viscosity (sec as measured by a Zahn Cup 3) | Coating Spreadability | Film Quality | Coating Thickness (microns) |
|---|---|---|---|
| 5 | Poor | Very poor | 2 |
| 10 | Poor | Very poor | 7 |
| 15 | Good | Excellent | 12 |
| 20 | Good | Excellent | 20 |
| 25 | Good | Excellent | 20 |
| 30 | Good | Very poor | 50 |

As depicted by Table 4, coating compositions having a viscosity of about 15 sec to about 25 sec demonstrated excellent coating properties. In contrast, compositions that were more or less viscous exhibited poor coating properties.

As used herein, all percentages (%) are percent by weight of the total composition, also expressed as weight/weight %, % (w/w), w/w, w/w % or simply %, unless otherwise indicated. Also, as used herein, the terms "wet" refers to relative percentages of the coating composition in a dispersion medium (e.g. water); and "dry" refers to the relative percentages of the dry coating composition prior to the addition of the dispersion medium. In other words, the dry percentages are those present without taking the dispersion medium into account. Wet admixture refers to the coating composition with the dispersion medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described.

Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. An overhead conductor comprising:
one or more conductors each having an outer surface; and
a coating layer on at least a portion of the outer surface of at least one of the conductors, the coating layer comprising a coating composition having a minimum film formation temperature ("MFFT") of about 20° C. or less; and
wherein the coating composition comprises a binder agent comprising:
a fluorocopolymer comprising the polymerization product of vinylidene fluoride monomer and one or more unsaturated fluorinated monomers; and
a non-fluorinated film-forming copolymer; and
wherein the coating composition has a viscosity of about 15 sec to about 25 sec when measured using a Zahn cup number 3.

2. The overhead conductor of claim 1, wherein the binder agent has an MFFT of about 20° C. or less.

3. The overhead conductor of claim 1, wherein the fluorocopolymer has a second heat enthalpy of crystalline fusion value of about 40 J/g or less when measured by a differential scanning calorimeter ("DSC") in accordance to ASTM E 793-06 (2012).

4. The overhead conductor of claim 1, wherein the binder agent comprises about 40% to about 90%, by weight, of the fluorocopolymer and wherein the fluorocopolymer comprises about 70 mol % to about 95 mol % vinylidene fluoride.

5. The overhead conductor of claim 1, wherein the non-fluorinated film forming copolymers comprise one or more acrylic polymers and methacrylic polymers and wherein the one or more unsaturated fluorinated monomers comprise one or more of hexafluoropropylene, tetrafluoroethylene, and chlorotrifluoroethylene.

6. The overhead conductor of claim 1, wherein the coating composition further comprises one or more film forming adjuvants to reduce the MFFT of the coating composition, the film forming adjuvants comprising one or more of a coalescing agent and a plasticizer; and
wherein the coalescing agent comprises one or more of dipropylene glycol methyl ether, dipropylene glycol methyl ether acetate, dipropylene glycol n-butyl ether, and dipropylene glycol dimethyl ether.

7. The overhead conductor of claim 1, wherein the coating composition further comprises one or more of a filler, a pigment, a thickener, a crosslinking agent, and a defoamer; and
wherein the filler comprises one or more of talc and calcined clay; and
wherein the pigment comprises titanium dioxide in a rutile form.

8. The overhead conductor of claim 1, wherein the coating composition is in direct contact with the at least a portion of the outer surface of the one or more conductors.

9. The overhead conductor of claim 1, wherein each of the one or more conductors are formed of aluminum or an alloy thereof.

10. The overhead conductor of claim 1, wherein the coating layer is thermoplastic.

11. The overhead conductor of claim 1, wherein the coating layer has an emissivity of about 0.7 or greater and the overhead conductor has an operating temperature about 10% lower than the operating temperature of an alternative overhead conductor constructed without a coating layer.

12. The overhead conductor of claim 1, wherein the coating layer has a thickness between about 2 microns and about 50 microns and the overhead conductor passes the 6 mm Mandrel Bend Test at about 23° C.

13. The overhead conductor of claim 1, wherein the coating composition is in an aqueous carrier liquid and the solids content of the coating composition is about 20% or more.

14. The overhead conductor of claim 1, wherein the coating composition is in an organic carrier liquid, the carrier liquid comprising one or more of methyl ethyl ketone, methyl isobutyl ketone, and diethyl carbonate and wherein the solids content of the coating composition is about 30% or less.

15. An overhead transmission line accessory comprising a coating layer on at least a portion of an outer surface of the overhead transmission line accessory, the coating layer comprising a coating composition having a minimum film formation temperature ("MFFT") of about 20° C. or less; and
wherein the coating composition comprises a binder agent comprising:
a fluorocopolymer comprising the polymerization product of vinylidene fluoride monomer and one or more unsaturated fluorinated monomers; and
a non-fluorinated film-forming copolymer; and
wherein the coating composition has a viscosity of about 15 sec to about 25 sec when measured using a Zahn cup number 3.

16. The overhead transmission line accessory of claim 15, wherein the binder agent has an MFFT of about 20° C. or less.

17. The overhead transmission line accessory of claim 15, wherein the fluorocopolymer has a second heat enthalpy of crystalline fusion value of about 40 J/g or less when measured by a differential scanning calorimeter ("DSC") in accordance to ASTM E 793-06 (2012).

18. The overhead transmission line accessory of claim 15, wherein the binder agent comprises about 40% to about 90%, by weight, of the fluorocopolymer and wherein the fluorocopolymer comprises about 70 mol % to about 95 mol % vinylidene fluoride.

19. The overhead transmission line accessory of claim 15, wherein the non-fluorinated film forming copolymers comprise one or more acrylic polymers and methacrylic polymers and wherein the one or more unsaturated fluorinated monomers comprise one or more of hexafluoropropylene, tetrafluoroethylene, and chlorotrifluoroethylene.

20. The overhead transmission line accessory of claim 15, wherein the coating composition further comprises one or more film forming adjuvants to reduce the MFFT of the coating composition, the film forming adjuvants comprising one or more of a coalescing agent and a plasticizer; and
wherein the coalescing agent comprises one or more of dipropylene glycol methyl ether, dipropylene glycol methyl ether acetate, dipropylene glycol n-butyl ether, and dipropylene glycol dimethyl ether.

21. The overhead transmission line accessory of claim 15, wherein the coating composition further comprises one or more of a filler, a pigment, a thickener, a crosslinking agent, and a defoamer; and
    wherein the filler comprises one or more of talc and calcined clay; and
    wherein the pigment comprises titanium dioxide in a rutile form.

22. The overhead transmission line accessory of claim 15, wherein the coating composition is in direct contact with the at least a portion of the outer surface of the overhead transmission line accessory.

23. The overhead transmission line accessory of claim 15, wherein the coating layer is thermoplastic.

24. The overhead transmission line accessory of claim 15, wherein the coating layer has an emissivity of about 0.7 or greater.

25. The overhead transmission line accessory of claim 15, wherein the coating layer has a thickness between about 2 microns and about 50 microns.

26. The overhead transmission line accessory of claim 15, wherein the coating composition is in an aqueous carrier liquid and the solids content of the coating composition is about 20% or more.

27. The overhead transmission line accessory of claim 15, wherein the coating composition is in an organic carrier liquid, the carrier liquid comprising one or more of methyl ethyl ketone, methyl isobutyl ketone, and diethyl carbonate and wherein the solids content of the coating composition is about 30% or less.

* * * * *